United States Patent [19]

Gellert

[11] 4,013,393
[45] Mar. 22, 1977

[54] VALVE-GATED INJECTION MOLDING MECHANISM

[76] Inventor: Jobst Ulrich Gellert, 11 Newton Road, Brampton, Ontario, Canada

[22] Filed: Feb. 4, 1976

[21] Appl. No.: 655,057

[30] Foreign Application Priority Data

Apr. 10, 1975 Canada .............................. 224366

[52] U.S. Cl. ......................... 425/245 R; 425/247
[51] Int. Cl.² ......................................... B29F 1/05
[58] Field of Search ............... 425/243, 244, 245 R, 425/245 NS, 247, 248, 250, DIG. 224–DIG. 227

[56] References Cited

UNITED STATES PATENTS

| 2,773,284 | 12/1956 | Kelly | 425/245 |
|---|---|---|---|
| 3,077,636 | 2/1963 | Peters | 425/247 |
| 3,113,346 | 12/1963 | Bright | 425/247 |
| 3,488,810 | 1/1970 | Gellert | 425/245 |
| 3,491,408 | 1/1970 | Natkins | 425/245 NS |
| 3,677,682 | 7/1972 | Putkowski | 425/244 |

FOREIGN PATENTS OR APPLICATIONS

| 2,061,267 | 12/1970 | Germany | 425/248 |
|---|---|---|---|
| 9,984 | 4/1959 | Japan | 425/245 |

Primary Examiner—Robert L. Spicer, Jr.
Assistant Examiner—W. R. Briggs
Attorney, Agent, or Firm—George H. Riches & Associates

[57] ABSTRACT

This invention relates to an improved valve-gated injection molding mechanism illustrated in a multi-cavity arrangement. A vertical valve pin reciprocates in a central bore in a heater enclosed in the mold actuated by an air operated piston through a rocker arm to precisely control the opening and closing of a gate into a cavity through which pressurized molten plastic material is supplied from a molding machine. A titanium alloy seal is provided in an air space between the heater nozzle and the mold near the gate to reduce the quantity of molten plastic material flowing into the space thereby reducing the creation of cold slugs and problems on color changes. The lower portion of the valve pin is formed of a highly conductive material such as a beryllium-copper alloy to increase heat transfer to the lower tip of the valve pin. This reduces the resistance of the valve pin penetrating the cold slug in the gate area, which permits a reduction in the amount of force necessarily transmitted through the rocker arm, thus reducing wear of the mechanism and increasing its operating life span. Structure of the rocker arm valve pin and piston is provided which eliminates rotation of the valve pin or piston relative to the rocker arm during use. This enables bearing contact to be made between the valve pin, rocker arm and piston along transverse ridges, thereby reducing pivotal wear. The rocker arm pivots about a pivot pin, the ends of which are received in a pair of downwardly opening slots in the mold for ease of manufacture and assembly.

3 Claims, 4 Drawing Figures

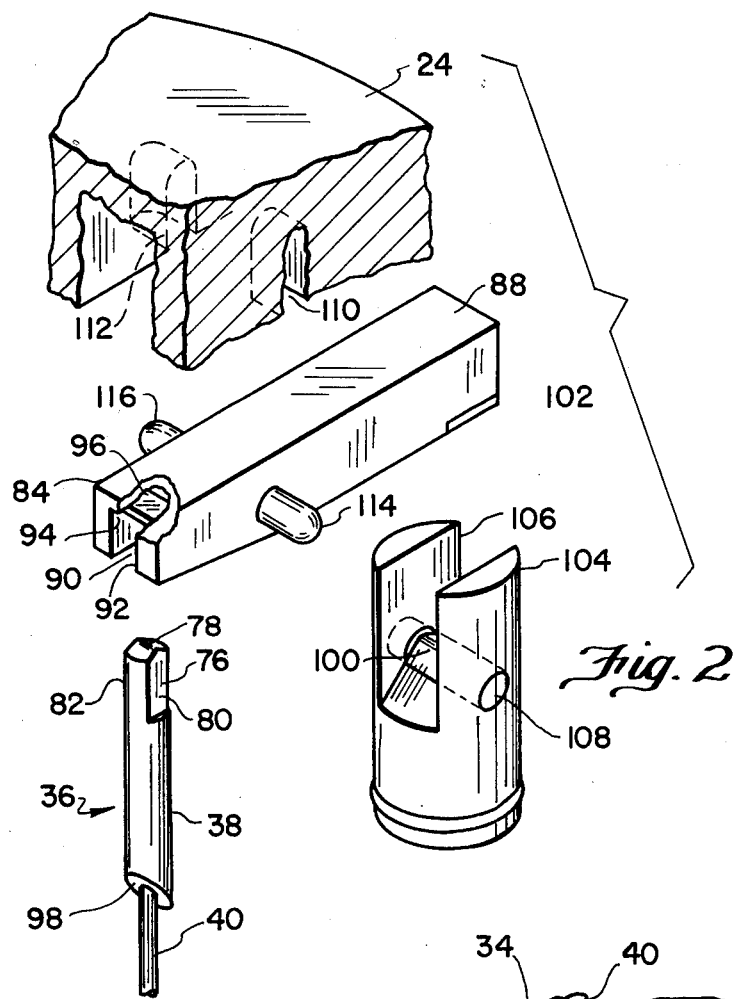
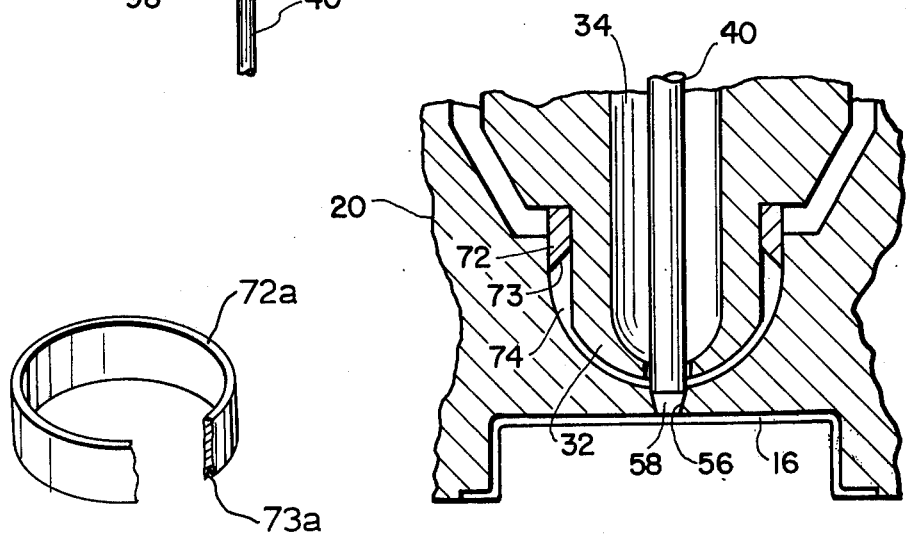

VALVE-GATED INJECTION MOLDING MECHANISM

This invention relates to improvements in valvegated injection molding mechanism. In a typical multi-cavity arrangement, a heater is enclosed in the mold above each cavity and molten plastic material is supplied from a centrally located molding machine through hot runner passages which extend through a manifold spreader plate and the heaters to the cavities. A valve pin is reciprocated vertically in a cylindrical bore in each heater by a rocker arm powered by an air operated piston. A lower tip of each valve pin extends through a lower nozzle portion of the heater to provide a valve in a gate in the mold leading to each cavity. Closing of the valve thus provided is controlled by controlling the air pressure to the pistons. Prior art mechanism of this general type are disclosed in the applicant's Canadian Pat. Nos. 840,892 issued May 5, 1970, 872,334 issued June 1, 1971, and 905,066 issued July 18, 1972.

The present invention disclosed herein in relation to one heater and cavity portion of a multi-cavity arrangement, may also apply to a single cavity arrangement. As is well known, heat transfer is of critical importance in mechanism of this type. In order to reduce undesirable heat transfer, the manifold spreader plate and the heaters containing the hot runner passages are generally isolated as much as structurally possible from the rest of the mold by a surrounding air space. In the past, the portion of this air space accessible from the valve and gate area has naturally filled with pressurized molten plastic material from the hot runner passage. Apart from heat transfer considerations, this has the disadvantage of introducing partially decomposed and discolored plastic material into the cavity from time to time which results in colour streaking following colour changes. Furthermore, the relatively large downward forces necessary to be applied to the valve pin to close the valve formed by the lower tip of the valve pin and the gate results in problems of wear of the mechanism with repeated long duration use.

In molding certain products, it is desirable that the tip of the valve pin be shaped to be compatible with the pattern of the molded object. Of course, this purpose is defeated if the valve pin is permitted to rotate during use. Furthermore, it has been found that an undesirable dead space at the junction of the hot runner passage and the valve pin bore may be substantially reduced by providing the valve pin with a sloping shoulder structure and preventing it from rotating during use. structural tolerances of the mechanism determining the reciprocal movement of the valve pin are critical. Therefore, wear of the bearing surfaces between the upper end of the valve pin and the rocker arm is undesirable and may be reduced through the use of a non-rotatable peaked structure of abrasion resistant materials. Wear of the bearing surfaces between the air operated piston and the rocker arm has the same undesirable effect and may also be reduced by a similar peaked non-rotatable structure. These close tolerance requirements also cause manufacture and assembly difficulties in inserting the rocker arm pivot pin through holes drilled in the manifold spreader plate and rocker arm. These problems may be reduced by receiving the ends of the pivot pin extending from the rocker arm in downwardly opening slots in the manifold spreader plate.

Accordingly, it is an object of the present invention to at least partially overcome these disadvantages by providing an improved valve-gated injection molding mechanism.

To this end, in one of its aspects, the invention provides an injection molding valve-gated mechanism having a vertical valve pin which reciprocates in a passage bore in a heater located in a mold to control flow of molten plastic from a molding machine to a cavity, the heater having a lower nozzle portion which is separated from the surrounding mold by an air space and through which the valve pin projects to provide a valve in a gate to the cavity, the improvement wherein a generally cylindrical seal is provided in the air space between the lower nozzle of the heater and the mold, the seal being sufficiently spaced from the valve to avoid unnecessary heat loss therethrough.

In another of its aspects, the invention further provides an injection molding valve-gated mechanism having a vertical valve pin which reciprocates in a passage bore in a heater located in a mold to control flow of molten plastic from a molding machine to a cavity, the heater having a lower nozzle portion which is separated from the surrounding mold by an air space and through which the valve pin projects to provide a valve in a gate to the cavity, the valve pin being reciprocated by an air operated piston through a pivoted rocker arm, the improvement wherein a cylindrical seal is provided in the air space between the heater nozzle and the mold and the valve pin has an upper end portion with flat opposite sides which is matingly received in a channel in the underside of the first end of the rocker arm to prevent rotation of the valve pin relative to the rocker arm during use.

In a further aspect, the invention provides the piston having a linearly peaked portion to provide a bearing ridge which extends between a pair of upwardly projecting side portions to receive the second end of the rocker arm in bearing contact thereon, the side portions preventing rotation of the piston relative to the rocker arm during use.

In a still further of its aspects, the invention provides injection molding valve-gated mechanism of the structure wherein the rocker arm pivots about a pivot pin extending transversely therethrough, the pin having opposite ends received in corresponding downwardly opening slots in the mold.

In yet another of its aspects, the invention further provides injection molding valve-gated mechanism of its structure wherein a lower portion of the valve pin is formed of a beryllium-copper alloy.

Further objects and advantages of the invention will appear from the following description taken together with the accompanying drawings in which:

FIG. 2 is an exploded perspective view showing a portion of a valve pin, a rocker arm, a piston and a portion of the manifold spreader plate seen in FIG. 1;

FIG. 3 is an enlargement of a portion of the sectional view seen in FIG. 1, showing a lower portion of the valve pin, the heater nozzle, and the surrounding portion of the mold; and FIG. 4 is a perspective view of a second embodiment of the cylindrical seal shown in FIG. 3.

Figure 1:
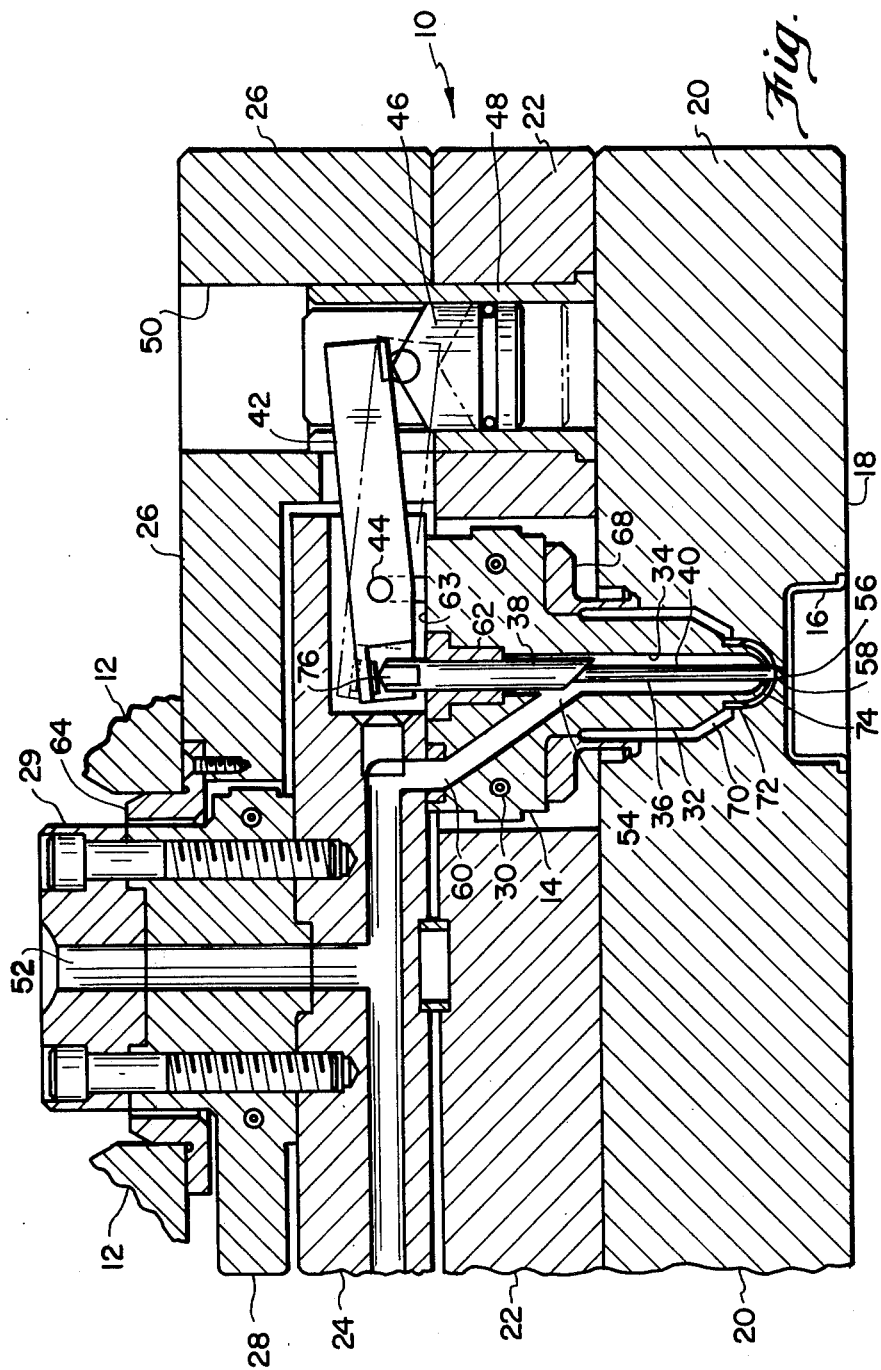
FIG. 1 is a partial vertical sectional view of a multi-cavity arrangement showing the mechanism according to a preferred embodiment of the invention.

Reference is first made to FIG. 1 which shows a portion of a multi-cavity mold 10 positioned beneath a molding machine 12 with a first heater 14 enclosed in the mold above cavity 16. Upward from the parting line 18, the mold 10 includes a cavity plate 20, a support plate 22, a manifold spreader plate 24, an annular collar 26, a second heater 28, and a nozzle seat plate 29 located directly beneath the molding machine 12. The first heater 14 has a circular electrical heater element 30, a lower nozzle portion 32 and a central vertical cylindrical bore 34. A vertical valve pin 36 having a larger upper portion 38 and a smaller lower portion 40 extends through the cylindrical bore 34.

In use, the valve pin 36 is reciprocated by a rocker arm 42 which pivots on a pivot pin 44 and is actuated by an air operated piston 46. Air pressure through air supply lines (not shown) drives piston 46 upward in a cylinder 48 located in a wall 50 in the annular collar 26 and the support plate 22. Molten plastic material is forced downward under pressure from the molding machine 12 through hot runner passage 52 which branches out through the manifold spreader plate 24 towards the different heaters and cavities. As may be seen in FIG. 1, the hot runner passage 52 angles downward through the heater 14 where it joins the bore 34 of the heater at junction 54. The molten plastic material passes on downward through the bore 34 around the smaller lower portion 40 of the valve pin 36 where it passes through gate 56 into the cavity 16. As may be seen in FIG. 3, a valve is provided by the frusto-conical lower tip 58 of valve pin 36 seating in the gate 56. The hot runner passage 52 enters the first heater 14 through collar 60 which projects slightly above the top surface of the heater 14 to provide sealing contact with the manifold spreader plate 24. The upper portion of the cylindrical bore 34 through the heater 14 extends through a bushing 62 which is centrally seated in the upper surface 63 of the heater 14.

Referring again to FIG. 1, the hot portions of the mold 10 through which the hot runner passage 52 extends are separated from the cooler portions of the mold 10 so far as structurally possible by air spaces to reduce heat transfer between them. For instance, mold locating ring 64 which is in contact with the molding machine 12 is spaced from the second heater 28, which is also spaced from the annular collar 26. The hot manifold spreader plate 24 is spaced and located from the cooler support plate 22 by cylindrical spacer 66. The first heater 14, while being securely positioned relative to the cavity plate 20 by insulation bushing 68, is spaced from the surrounding support plate 22 and cavity plate 20 by air space 70. A seal 72 is located between the lower nozzle portion 32 of the heater and the wall of the surrouding cavity plate 20. In the preferred embodiment, this seal is formed of an alloy having over 90% titanium and lesser amounts of aluminum, vanadium and other elements. This seal 72, while being generally cylindrical in shape has a sloping bottom surface 73 which comes to a knife edge adjacent the wall of the cavity plate 20. The pressure of the molten plastic material on the sloping surface 73 slightly deflects the seal 72 to prevent the molten plastic material from flowing upward into air space 70 and confine it to smaller space 74 adjacent the lower tip 58 of the valve pin 36. This space 74 is sufficiently small that at least a portion of the molten plastic material in it is drawn out into the cavity 16 in a cyclical pattern of successive injections into the cavity, thus reducing the production of colour defective products on colour changes. The titanium-steel alloy used to form the seal 72 has the desirable properties of very high structural strength combined with low heat conductivity.

In the second embodiment shown in FIG. 4, the cylindrical seal 72a has an inverted V-shaped lower surface 73a which the pressure of the molten plastic slightly deflects outward in both directions during use. This provides an improved seal against both the cavity plate 20 and the lower nozzle portion 32 of the heater 14. In addition, the sides of the V provide sufficient flexibility to allow for slight lateral movement of the nozzle portion 32 relative to the cavity plate 20 due to thermal expansion.

As clearly seen in FIG. 2, the vertical valve pin 36 has an upper end portion 76 which is linearly peaked to provide a first bearing ridge 78 and has a pair of flat vertical sides 80, 82. The rocker arm 42 has a first end 84, a transverse pivot pin 44 therethrough and a second end 88. The first end 84 of the rocker arm 42 has a downwardly opening channel 90 therein defined between flat vertical channel walls 92, 94. The channel 90 has a first rectangular carbide pad 96 embedded in its top surface and the channel 90 is shaped to receive the upper end portion 76 of the vertical valve pin 36 with the ridge 78 in bearing contact with the carbide pad 96. In this position, the flat vertical sides 80, 82 of the upper end portion 76 of the vertical valve pin 36 extend between the channel walls 92, 94 to prevent rotation of the vertical valve pin 36 relative to the rocker arm 42. As may be seen in FIG. 1, the larger upper portion 38 of the vertical valve pin 36 joins the smaller lower portion 40 at sloping shoulder 98. This sloping shoulder 98 avoids a substantial dead spot for the accumulation of molten plastic material at the junction 54 of the hot runner passage 52 with the bore 34 to facilitate faster colour changes. The above described structure of the upper end portion 76 of the vertical valve pin 36 and the first end portion 76 of the vertical valve pin 36 and the first end 84 of the rocker arm 42 which prevents rotation of the valve pin 36 during use enables this sloping shoulder 98 to be provided. It is apparent from FIG. 1 that if the valve pin 36 were permitted to rotate during use, it would at least partially block the hot runner passage 52 at the junction 54. The fact that the valve pin 36 is unable to rotate during use also enables the pivotal bearing contact between the valve pin 36 and the rocker arm 42 to be along the transverse line of ridge 78. This provides a reduction in wear from the point contact which would otherwise be used and thus extends the operating life span of the mechanism. This non-rotatable structure also permits the tip of the valve pin to be shaped to be compatible with the pattern of certain molded products.

Piston 46 is similarly peaked to provide a second bearing ridge 100 which makes bearing contact during use with a second carbide pad 102 on the second end 88 of the rocker arm 42. In this case, the second end 88 of the rocker arm 42 is rectangular shaped in cross section, and the bearing ridge 100 of the piston 46 extends between a pair of upwardly projecting side portions 104, 106. Thus, during use the second end 88 of the rocker arm 42 is received between the pair of side portions 104, 106 to prevent rotation of the piston 46 relative to the rocker arm 42. The piston bearing ridge 100 is formed of carbide to the necessary close tolerances by inserting a carbide pin transversely through the piston 46 and then grinding it to form the ridge. As described above, the provision of the bearing contact between the piston 46 and the rocker arm 42 along the transverse line through the piston ridge 100 reduces wear during pivotal action of the rocker arm 42. The reduction of wear to a minimum between the moving parts of the mechanism is critical to an extended life span because the lower tip 58 of the valve pin 36 must repeatedly tightly seat in the gate 56 to provide a cosmetically clean gated product.

It has been found that the amount of force which must be transmitted through the rocker arm 42 (and thus the amount of wear) necessary to provide continuous cosmetic clean gating by the lower tip 58 of the valve pin 36 may be reduced by forming the smaller lower portion 40 of the valve pin 36 of a material more highly conductive than the steel of which the remainder of the valve pin is formed. This increases the transfer of heat downward from the area adjacent the electrical heater element 30 to increase the ability of the valve pin to heat seal itself through the cold slug into the valve gate 56 in the cooler cavity plate 20. A material which has been found to have suitable heat transfer characteristics and strength is a beryllium-copper alloy having from 1.0 to 4.0 percent beryllium.

Rocker arm 42 pivots about pivot pin 44 to force the valve pin 36 downward to close the gate 56 when piston 46 is actuated upward by air pressure. When the air pressure is exhausted, the pressure of the molten plastic material from the molding machine 12 forces the valve pin 36 upward, opening the gate 56 and driving the piston 46 downward. Thus, under all operating conditions the rocker arm 42 exerts an upward force on the pivot pin 44. Therefore, as clearly seen in FIG. 2, it has been found possible to avoid a problem in manufacturing the mechanism to sufficiently close tolerances in drilling holes in the manifold spreader plate 24 to receive the pivot pin 44 by providing the manifold spreader plate 24 with a pair of downwardly opening slots 110, 112 to receive the ends 114, 116 of the pivot pin 44.

Although the disclosure describes and illustrates a preferred embodiment of the invention, it is to be understood that the invention is not restricted to this particular form of the mechanism. More particularly, it is apparent that cylindrical seal 72 and the smaller lower portion 40 of the vertical valve pin 36 may be formed to other materials having suitable characteristics. Similarly, other structural arrangements may be provided to prevent rotation of the valve pin 36 and the piston 46 relative to the rocker arm 42 during use.

I claim:

1. In an injection molding valve-gated mechanism having a vertical valve pin which reciprocates in a passage bore in a heater located in a mold to control flow of molten plastic from a molding machine to a cavity, the heater having a lower nozzle portion which is separated from the surrounding mold by an air space and through which the valve pin projects to provide a valve in a gate to the cavity, the valve pin being reciprocated by an air operated piston through a pivoted rocker arm having first and second ends, the improvement wherein the valve pin has a linear peak to provide a first bearing ridge extending transversely to the longitudinal axis of the rocker and has an upper end portion with flat opposite sides which is matingly received in a channel in the underside of the first end of the rocker arm to prevent rotation of the valve pin relative to the rocker arm during use, a first planar bearing surface on the first end of the rocker that cooperates with said first bearing ridge, the piston has a linear peak portion to provide a second bearing ridge extending transversely to the longitudinal axis of the rocker which extends between a pair of upwardly projecting side portions of said piston to receive parallel surfaces of the periphery of the second end of the rocker arm in bearing contact thereon, a second planar bearing surface on the second end of said rocker that cooperates with said second bearing ridge, the side portions preventing rotation of the piston relative to the rocker arm during use.

2. Mechanism as claimed in claim 1 wherein a lower portion of the valve pin is formed of a beryllium-copper alloy.

3. Mechanism as claimed in claim 1 wherein a lower portion of the valve pin is formed of beryllium-copper alloy having 1.0–4.0 percent beryllium.

* * * * *